United States Patent [19]

Nishikawa

[11] Patent Number: 4,512,064
[45] Date of Patent: Apr. 23, 1985

[54] METHOD OF CONNECTING PULL TAB WITH SLIDE FASTENER SLIDER

[75] Inventor: Kiyotada Nishikawa, Kurobe, Japan

[73] Assignee: Yoshida Kogyo K.K., Tokyo, Japan

[21] Appl. No.: 570,219

[22] Filed: Jan. 12, 1984

Related U.S. Application Data

[63] Continuation of Ser. No. 221,976, Jan. 2, 1981.

[30] Foreign Application Priority Data

Feb. 9, 1980 [JP] Japan .................. 55-15729

[51] Int. Cl.³ ............................. A44B 19/00
[52] U.S. Cl. .................. 24/429; 24/230.5 W
[58] Field of Search .......... 24/429, 430, 421, 205, 24/230.5 W

[56] References Cited

U.S. PATENT DOCUMENTS

| | | | |
|---|---|---|---|
| 2,524,574 | 10/1950 | Ryser | 24/421 |
| 2,629,908 | 3/1953 | Keck | 24/205 |
| 2,709,287 | 5/1955 | Shelton et al. | 24/230.5 W |
| 2,788,557 | 4/1957 | Garsson | 24/429 |
| 4,389,758 | 6/1983 | Akashi | 24/429 |

FOREIGN PATENT DOCUMENTS

| | | | |
|---|---|---|---|
| 234088 | 6/1943 | Switzerland | 24/429 |
| 264282 | 10/1949 | Switzerland | 24/429 |
| 264283 | 10/1949 | Switzerland | 24/429 |
| 273689 | 2/1951 | Switzerland | 24/429 |

Primary Examiner—William E. Lyddane
Assistant Examiner—Peter A. Aschenbrenner
Attorney, Agent, or Firm—Robert E. Burns; Emmanuel J. Lobato; Bruce L. Adams

[57] ABSTRACT

A pull tab connector for slide fastener sliders comprises a closed loop formed of a piece of resilient wire and having a pair of stems projecting from the loop, the stems being juxtaposed and overlying each other. The stems are aligned with each other in a plane perpendicular to the general plane of the loop. In use, the stems of the loop are angularly moved about one another until they are aligned with each other in the general plane of the loop. Then the stems are inserted in an axial hole in a pull tab, while a pair of bottom portions of the loop are received in a transverse recess in the pull tab which recess communicates with the axial hole.

3 Claims, 14 Drawing Figures

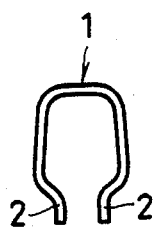
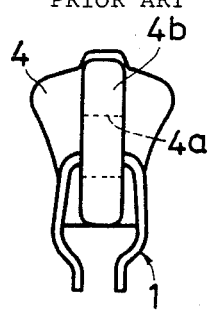
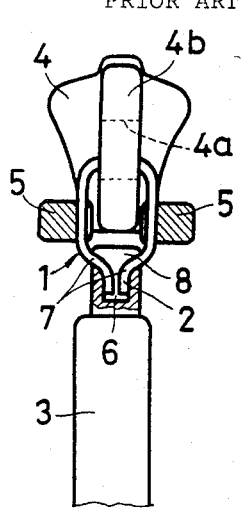
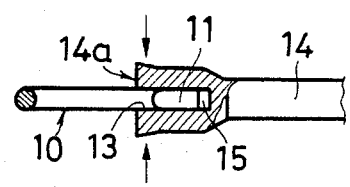
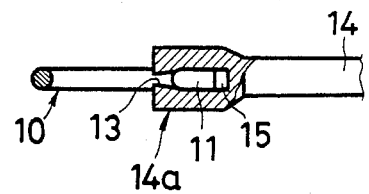

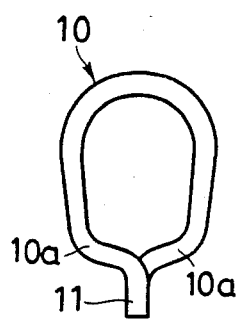
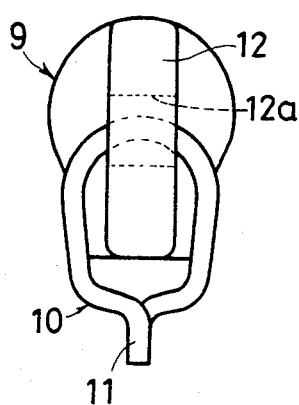
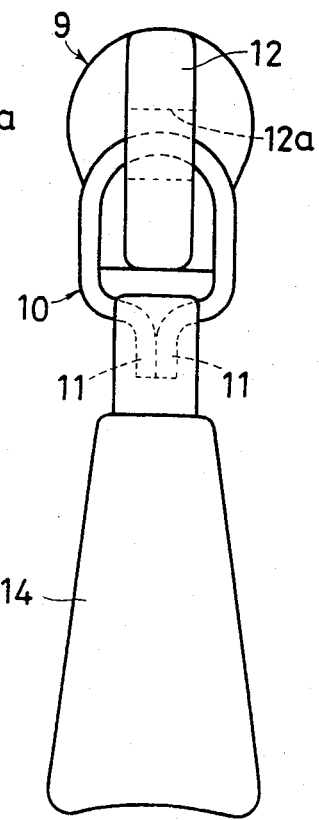
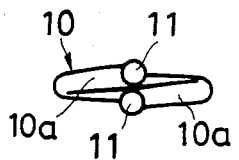
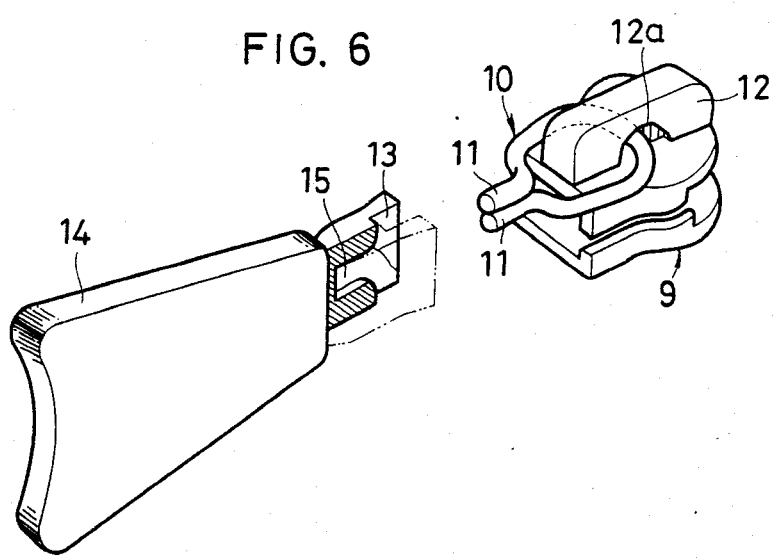

METHOD OF CONNECTING PULL TAB WITH SLIDE FASTENER SLIDER

This is a continuation of application Ser. No. 221,976, filed Jan. 2, 1981.

BACKGROUND OF THE INVENTION

1. Field of the Invention

The present invention relates generally to sliders for slide fasteners, and more particularly to a method of connecting a pull tab to such.

2. Prior Art

U.S. Pat. No. 2,524,574 issued Oct. 3, 1950 discloses a slider for slide fasteners in which a pull tab is connected to a slider body by means of a loop formed of a resilient wire. The wire loop is of rectangular shape having a pair of ends or stems projecting therefrom. The two ends of the wire loop, before the latter is attached to the pull tab, are spaced from each other so that the loop is normally of a U shape with a narrow open end. In assembly, the U-shaped wire loop is threaded through a bridge on the slider body. The two wire ends are brought close to each other and are then inserted in an axial hole in the pull tab, at which time a portion of the rectangular loop enters into a transverse recess communicating with the axial hole. After that, such a recessed end of the pull tab is pressed or deformed so as to close above the loop portion engaged in the recess, retaining the two wire ends in the axial hole. Thus the wire loop is permanently attached to the pull tab.

However, this prior pull tab connector is not so practical especially in an automatic assembling of sliders in which a succession of slider bodies, each carrying a wire loop threaded through a bridge of a respective slider, is fed to a following station. Because of the open ended loop, the prior pull tab connector is easily removed from the slider body while the latter is being fed.

SUMMARY OF THE INVENTION

According to the present invention, a pull tab connector for slide fastener sliders comprises a closed loop formed of a piece of resilient wire and having a pair of wire ends or stems projecting from the loop. The two stems of the wire loop are juxtaposed and overlapping each other. Moreover, the stems of the loop are aligned with each other in a plane perpendicular to the general plane of the loop. In use, the closed wire loop is threaded through a bridge on a slider body. The juxtaposed stems are introduced into a transverse recess in a pull tab, at which time the transverse recess in the pull tab lies at a right angle to the general plane of the loop. Then the pull tab is turned about its longitudinal axis until the transverse recess is aligned with the general plane of the loop, whereupon the stems of the loop are inserted in an axial hole in the pull tab so that the bottom of the closed loop portion is received in the transverse recess. Finally, such a recessed end of the pull tab is pressed or deformed so as to close above the loop portion engaged in the recess.

An object of the present invention is to provide a pull tab connector which is particularly suitable for use in an automatic assembling of a slide fastener slider.

Another object of the invention is to provide a pull tab connector for slide fastener sliders which is prevented from being accidentally removed from a slider body during the automatic assembling of the slider.

Many other advantages, features and additional objects of the present invention will become manifest to those versed in the art upon making reference to the detailed description and the accompanying drawings in which a preferred embodiment incorporating the principles of the present invention is shown by way of illustrative example.

BRIEF DESCRIPTION OF THE DRAWINGS

FIG. 1A is a front view of a prior art pull tab connector for slide fastener sliders;

FIGS. 1B and 1C illustrate the manner in which a pull tab is connected to a slider body by the prior connector of FIG. 1A;

FIG. 2 is a front view of a pull tab connector for slide fastener sliders according to the present invention;

FIG. 3 is a bottom view of the pull tab connector of FIG. 2;

FIG. 4 is a front view of a slider body, with the pull tab connector of FIGS. 2 and 3 threaded through a bridge on the slider body;

FIG. 5 is a front view of an assembled slide fastener slider, showing the pull tab connector of FIG. 4 as it is attached to a pull tab;

FIG. 6 is a perspective view, with parts broken away, of the slide fastener slider of FIG. 5, showing the manner in which a pair of ends of the pull tab connector is inserted in a transverse recess of the pull tab;

FIGS. 11 and 12 illustrate the manner in which a recessed end of the pull tab is pressed or deformed to permanently retain the bottom portions of the pull tab connector in the transverse recess.

DETAILED DESCRIPTION

Figure 7:
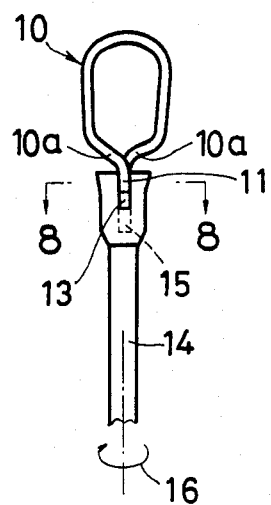
FIG. 7 is a front view of the pull tab connector of FIGS. 2 and 3, showing a pair of bottom portions of the connector as they are received in the transverse recess in the pull tab.

FIG. 1A shows a prior art pull tab connector for slide fastener sliders. The prior pull tab connector comprises a loop 1 formed of a resilient wire. The wire loop 1 has a pair of ends or stems 2,2 projecting therefrom. The two stems 2,2 of the loop 1, before the latter is attached to a pull tab 3 as described below, are normally spaced from each other. Thus the loop 1 is normally of a U shape with a narrow open end.

In use, the U-shaped wire loop 1 is threaded through an opening 4a in a bridge 4a mounted on a slider body 4, as shown in FIG. 1B. The two stems 2,2 of the loop 1 are brought close to each other by means of pincers 5 and are then inserted in an axial hole 6 in the pull tab 3, as shown in FIG. 1C. At that time, portions 7,7 of the loop 1 enters into a transverse recess 8 communicating with the axial hole 6. After that, such a recessed end of the pull tab 3 is pressed or deformed so as to close above the loop portions 7,7 engaged in the transverse recess 8, retaining the stems 2,2 in the axial hole 6. Thus the wire loop 1 has been permanently attached to the pull tab 3.

However, this prior art pull tab connector is not so practical especially in an automatic assembling of sliders in which a succession of slider bodies, each carrying a wire loop threaded through the bridge of a respective slider, is fed to a following station. Because of the open ended loop 1, the prior pull tab connector is easily removed from the slider body 3 while the latter is being fed.

The present invention is an improvement on the prior art discussed above and is particularly useful when embodied in a pull tab connector for slide fastener sliders (hereinafter referred to as "connector") such as shown in FIGS. 2 and 3. The connector comprises a closed loop 10 formed of a piece of resilient wire and having a pair of wire ends or stems 11,11 projecting from a pair of bottom portions 10a,10a, respectively, of the loop 10. Preferably, the resilient wire is made of stainless steel.

The stems 11,11 of the loop 10 are juxtaposed and overlapping each other. Moreover, the stems 11,11 are aligned with each other in a plane perpendicular to the general plane of the loop 10.

Figure 9:
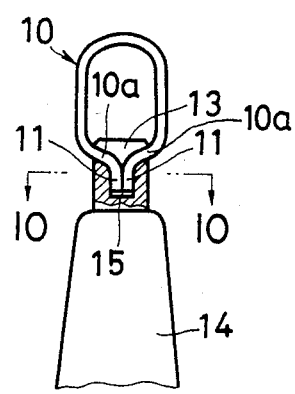
FIG. 9 is a view similar to FIG. 7, but showing the ends of the connector as they are inserted in the axial hole in the pull tab.
Figure 8:
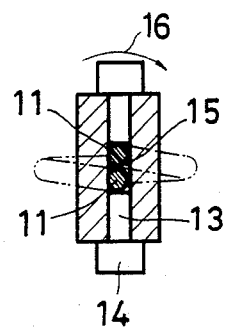
FIG. 8 is an enlarged cross-sectional view taken along section line 8—8 of FIG. 7.
Figure 10:
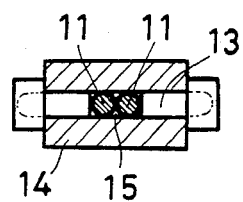
FIG. 10 is an enlarged cross-sectional view taken along section line 10—10 of FIG. 9.

In use, the wire loop 10 is threaded through an opening 12a in a bridge 12 mounted on a slider body 9, as shown in FIG. 4. The stems 11,11 are introduced into a transverse recess 13 in one end 14a of a pull tab 14 (FIGS. 6, 7 and 8), at which time the general plane of the pull tab 14 and thus the transverse recess 13 lies at a right angle to the general plane of the loop 10. Then the pull tab 14 is turned about its longitudial axis, in the direction of an arrow 16 (FIGS. 7 and 8), until the transverse recess 13 is aligned with the general plane of the loop 10 (FIGS. 9 and 10), namely 90 degrees. The two stems 11,11 are thus aligned with each other in the general plane of the loop 10. After that, the stems 11,11 are inserted in an axial hole 15, which communicates with the transverse recess 13, so that the bottom portions 10a,10a of the loop 10 are received in the transverse recess 13. At that time, because the loop 10 has the property of regaining its original shape (of FIGS. 7 and 8), the right and left (as viewed in FIG. 10) stems 11,11 are pressed against a pair of unnumbered upper and lower horizontal (as viewed in FIG. 10) walls, respectively, of the axial hole 15, while the right and left bottom portions 10a,10a of loop 10 are pressed against a pair of unnumbered upper and lower horizontal walls, respectively, of the transverse recess 13. Thus the loop 10 has been provisionally but sufficiently strongly attached to the pull tab 14 without use of pincers 5 (FIG. 1C), which is necessary for the prior art pull tab connector 1. Finally, such a recessed end 14a of the pull tab 14 is pressed or deformed so as to close above (on the left side in FIGS. 11 and 12) the loop's bottom portions 10a,10a engaged in the transverse recess 13. As a result, a complete slide fastener slider has been provided (FIG. 5).

As mentioned above, this pull tab connector is in the form of a closed loop and is hence prevented from being accidentally removed from a slider body. This facilitates an automatic assembling of a pull tab with a slider.

Although various minor modifications may be suggested by those versed in the art, it should be understood that I wish to embody within the scope of the present warranted hereon, all such embodiments as reasonably and properly come within the scope of my contribution to the art.

What is claimed is:

1. A method of connecting a planar pull tab having at one end an axial hole extending in from a transverse recess with a slide fastener slider having a bridge with an opening therein, comprising the steps of:

forming a piece of resilient wire into a closed planar loop with two straight wire end portions projecting outwardly from said loop, said wire end portions being parallel, juxtaposed in contact and overlying one another in a plane generally perpendicular to the plane of said loop, separating said end portions sufficiently to thread one end portion through said opening in the bridge of said slider to interlink said wire loop with said slider, inserting said juxtaposed wire end portions into said transverse recess of said pull tab with the plane of said wire end portions generally coinciding with the plane of said pull tab and with the plane of said loop generally perpendicular to the plane of said pull tab, turning said pull tab approximately 90° about its longitudinal axis relative to said loop whereby said wire end portions are displaced relative to one another so as to be aligned with one another in the general plane of said loop, moving said pull tab and loop relatively toward one another to insert said wire end portions into said axial hole of said pull tab and bring an adjacent portion of said loop in said recess, and securing said wire loop to said pull tab.

2. A method according to claim 1, in which said wire loop is formed in generally rectangular shape with said wire end portions projecting medially from one end of said rectangle.

3. A method according to claim 1, in which said wire loop is secured to said pull tab by deforming toward one another portions of said pull tab on opposite sides of said transverse recess.

* * * * *